(12) United States Patent
Marinier et al.

(10) Patent No.: US 9,210,633 B2
(45) Date of Patent: Dec. 8, 2015

(54) METHOD AND APPARATUS FOR AVOIDING INTERFERENCE FROM CLOSED SUBSCRIBER GROUP CELLS

(75) Inventors: Paul Marinier, Brossard (CA); Diana Pani, Montreal (CA); Rocco DiGirolamo, Laval (CA); Jean-Louis Gauvreau, La Prairie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 458 days.

(21) Appl. No.: 12/762,806

(22) Filed: Apr. 19, 2010

(65) Prior Publication Data

US 2010/0265918 A1    Oct. 21, 2010

Related U.S. Application Data

(60) Provisional application No. 61/170,973, filed on Apr. 20, 2009, provisional application No. 61/171,721, filed on Apr. 22, 2009.

(51) Int. Cl.
| | |
|---|---|
| *H04W 4/00* | (2009.01) |
| *H04W 36/20* | (2009.01) |
| *H04W 84/04* | (2009.01) |
| *H04W 48/20* | (2009.01) |
| *H04W 36/08* | (2009.01) |
| *H04W 36/34* | (2009.01) |
| *H04W 36/04* | (2009.01) |

(Continued)

(52) U.S. Cl.
CPC ............ *H04W 36/20* (2013.01); *H04W 84/045* (2013.01); *H04W 36/04* (2013.01); *H04W 36/08* (2013.01); *H04W 36/34* (2013.01); *H04W 48/02* (2013.01); *H04W 48/18* (2013.01); *H04W 48/20* (2013.01)

(58) Field of Classification Search
CPC ... H04W 36/04; H04W 84/045; H04W 24/02; H04W 48/20; H04W 36/08; H04W 36/34; H04W 48/02; H04L 5/0096
USPC ........... 370/310.1, 310.2, 328–338, 341, 437, 370/443–444; 455/434, 435.2, 435.3, 444, 455/450, 452.1, 558
See application file for complete search history.

(56) References Cited

U.S. PATENT DOCUMENTS 6,507,570 B1    1/2003  Holma et al.
8,254,923 B2 *  8/2012  Jung et al. .................. 455/435.3

(Continued)

FOREIGN PATENT DOCUMENTS

| | | |
|---|---|---|
| CN | 101296451 A | 10/2008 |
| KR | 20040048038 A | 6/2004 |
| WO | 2008112161 A2 | 9/2008 |

OTHER PUBLICATIONS

LTE; Evolved Universal Terrestrial Radio Access (E-UTRA); User Equipment (UE) procedures in idle mode (3GPP TS 36.304 version 8.5.0 Release 8); ETSI TS 136 304 V8.5.0 (Apr. 2009).

(Continued)

*Primary Examiner* — David Oveissi
(74) *Attorney, Agent, or Firm* — Volpe and Koenig, P.C.

(57) ABSTRACT

Methods and apparatus are disclosed for avoiding interference from transmissions coming from a home Node B, a home evolved Node B (HeNB) or closed subscriber group (CSG) cells when a wireless transmit receive unit (WTRU) is moving through a dense deployment of CSG cells.

25 Claims, 6 Drawing Sheets

(51) Int. Cl.
*H04W 48/02* (2009.01)
*H04W 48/18* (2009.01)

(56) References Cited

U.S. PATENT DOCUMENTS

| | | | |
|---|---|---|---|
| 8,310,946 B2 | 11/2012 | Somasundaram et al. | |
| 8,711,767 B2 | 4/2014 | Balasubramanian et al. | |
| 2002/0093922 A1* | 7/2002 | Grilli et al. | 370/328 |
| 2004/0162074 A1 | 8/2004 | Chen | |
| 2008/0227447 A1* | 9/2008 | Jeong et al. | 455/434 |
| 2009/0042593 A1 | 2/2009 | Yavuz et al. | |
| 2009/0070694 A1 | 3/2009 | Ore et al. | |
| 2010/0029274 A1* | 2/2010 | Deshpande et al. | 455/435.3 |
| 2010/0113026 A1* | 5/2010 | Narasimha et al. | 455/444 |

OTHER PUBLICATIONS

LTE; Evolved Universal Terrestrial Radio Access (E-UTRA); User Equipment (UE) procedures in idle mode (3GPP TS 36.304 version 8.8.0 Release 8); ETSI TS 136 304 V8.8.0 (Feb. 2010).
LTE; Evolved Universal Terrestrial Radio Access (E-UTRA); User Equipment (UE) procedures in idle mode (3GPP TS 36.304 version 9.1.0 Release 9); ETSI TS 136 304 V9.1.0 (Feb. 2010).
Universal Mobile Telecommunications System (UMTS); User Equipment (UE) procedures in idle mode and procedures for cell reselection in connected mode (3GPP TS 25.304 version 8.5.0 Release 8); ETSI TS 125 304 V8.5.0 (Apr. 2009).
Universal Mobile Telecommunications System (UMTS); User Equipment (UE) procedures in idle mode and procedures for cell reselection in connected mode (3GPP TS 25.304 version 8.8.0 Release 8); ETSI TS 125 304 V8.8.0 (Feb. 2010).
Universal Mobile Telecommunications System (UMTS); User Equipment (UE) procedures in idle mode and procedures for cell reselection in connected mode (3GPP TS 25.304 version 9.0.0 Release 9); ETSI TS 125 304 V9.0.0 (Feb. 2010).
Nokia, "Usage of IFRI with Cell Reselection to CSG cells," 3GPP TSG-RAN WG2 meeting #65-bis , R2-092416, Seoul, Korea, Mar. 23-27, 2009.
Motorola, "Interference in Mixed Carrier HeNB deployments," 3GPP TSG-RAN WG2#65bis, R2-092295, Seoul, Korea, Mar. 23-27, 2009.
Third Generation Partnership Project, "Technical Specification Group Radio Access Network; User Equipment (UE) procedures in idle mode and procedures for cell reselection in connected mode(Release 1999)," 3GPP TS 25.304 V3.14.0 (Mar. 2004).
Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).
Third Generation Partnership Project, "Technical Specification Group Radio Access Network; User Equipment (UE) procedures in idle mode and procedures for cell reselection in connected mode (Release 6)," 3GPP TS 25.304 V6.10.0 (Mar. 2008).
Third Generation Partnership Project, "Technical Specification Group Radio Access Network; User Equipment (UE) procedures in idle mode and procedures for cell reselection in connected mode (Release 7)," 3GPP TS 25.304 V7.7.0 (Sep. 2008).
Third Generation Partnership Project, "Technical Specification Group Radio Access Network; User Equipment (UE) procedures in idle mode and procedures for cell reselection in connected mode (Release 7)," 3GPP TS 25.304 V7.8.0 (Sep. 2009).
Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.1.0 (Mar. 2008).
Qualcomm Europe, "Email discussion report for [64b:2] CSG related cell reselection details," 3GPP TSG-RAN WG2 #65, R2-091211, Athens, Greece (Feb. 9-13, 2008).
T-Mobile, "Correction to UE behaviour while 300s frequency barring timer is running," 3GPP TSG-RAN2 Meeting #65bis, R2-092193 (Mar. 23-27, 2009).
T-Mobile, "Effect of partial roaming restrictions on cell reselection and proposed performance enhancement," 3GPP TSG-RAN-WG2 Meeting #51, R2-050784 (Feb. 13-17, 2006).

* cited by examiner

METHOD AND APPARATUS FOR AVOIDING INTERFERENCE FROM CLOSED SUBSCRIBER GROUP CELLS

CROSS REFERENCE TO RELATED APPLICATIONS

This application claims the benefit of U.S. provisional application No. 61/170,973 filed Apr. 20, 2009, and U.S. provisional application No. 61/171,721 filed Apr. 22, 2009, which are incorporated by reference as if fully set forth herein.

FIELD OF INVENTION

This application is related to wireless communications.

BACKGROUND

Home evolved Node Bs (H(e)NBs) and Home Node Bs (HNBs) (collectively referred to as HNBs) have been introduced in long term evolution (LTE) and Universal Mobile Telecommunications System (UMTS), respectively, as part of an effort to provide improved spectral efficiency, reduced latency, and better utilization of radio resources for faster user experiences, richer applications and lower cost services. The HNB provides subscribers with access to network services over extremely small service areas, such as homes or small offices. A subscriber (e.g., an individual or an organization) may deploy a HNB over an area where such service is desired. An HNB closed subscriber group (CSG) cell is a defined area over which radio coverage provided by the HNB may only be accessed by a group of subscribers authorized to use the services of the cell. HNBs may be deployed on the same carrier as open or macro base stations. This may be referred to as "mixed carrier deployment". HNBs may also be deployed in a dedicated carrier.

A open cell may have the possibility of signaling an "intra-frequency reselection indicator" (IFRI) that indicates to the neighboring wireless transmit/receive units (WTRUs) whether they are allowed to stay camped on another cell that uses the same frequency in case the open cell is barred. In order to prevent excessive interference with the barred cell when the WTRU initiates communication with a neighbor cell on the same frequency, the IFRI may be set to "not allowed". This forces the WTRUs for which the barred cell is best ranked, to camp on another frequency. However, a WTRU may not obey the IFRI transmitted from a CSG cell in order to prevent an excessive number of reselections to other frequencies in dense HNB deployments. A WTRU is not allowed to camp on a CSG cell which is not suitable for the WTRU (i.e., the WTRU is not member of a CSG cell).

When the frequency used by both the open base stations and HNBs is set as the highest priority by the network, a WTRU may camp on a cell on this frequency as long as the signal strength or quality is above a threshold. Accordingly, a WTRU located in an area of densely deployed HNBs may find itself in a situation where the best ranked cell from signal strength (or quality) point-of-view is a CSG cell, but this CSG cell is not suitable because the WTRU is not a member of this CSG. However, since the WTRU ignores the IFRI indicator from this CSG cell it would stay camped on an open cell on the same frequency. At the time of initiating communication with the network, the WTRU is likely to be heavily interfered with by the CSG cell if the CSG cell is heavily loaded. As a result, service at this location will be denied for the WTRU.

In one proposed solution, the WTRU should obey the IFRI indication from the CSG cell for a certain amount of time. This solution, however, results in a large number of cell reselections to other frequencies. In another solution, the WTRU would only be allowed to stay camped on the open cell if it is sufficiently close to the CSG cell. In the proposed solutions, the WTRU would be denied service if no other cell is available on another frequency. These issues may be addressed by implementing methods for avoiding interference from HNB transmissions from the CSG cell when the WTRU is moving through a dense deployment of HNBs.

SUMMARY

Methods and apparatus are disclosed for avoiding interference from transmissions coming from a home Node B, a home evolved Node B (HeNB) or closed subscriber group (CSG) cells when a wireless transmit receive unit (WTRU) is moving through a dense deployment of CSG cells.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node B, an evolved Node B, a site controller, an access point (AP), or any other type of interfacing device capable of operating in a wireless environment.

Home evolved Node Bs (H(e)NBs) and Home Node Bs (HNBs) (collectively referred to as HNBs) refer to a physical device that may be similar to a wireless local area network (WLAN) access point (AP). The HNB provides users with access to services, such as long term evolution (LTE) and Universal Mobile Telecommunications System (UMTS) services, over extremely small service areas, such as homes or small offices. The HNB is intended to connect to the operators' core network by using, for example, the public internet connections available freely today at homes across the country (e.g., digital subscriber line (DSL)). This may be particularly useful in areas where LTE has not been deployed, and/or in areas where legacy third generation partnership program (3GPP) radio access technology (RAT) coverage already exists. This may also be useful in areas where LTE coverage may be faint or non-existent due to, for example, the occurrence of radio transmission problems in an underground metro or a shopping mall.

Figure 1:
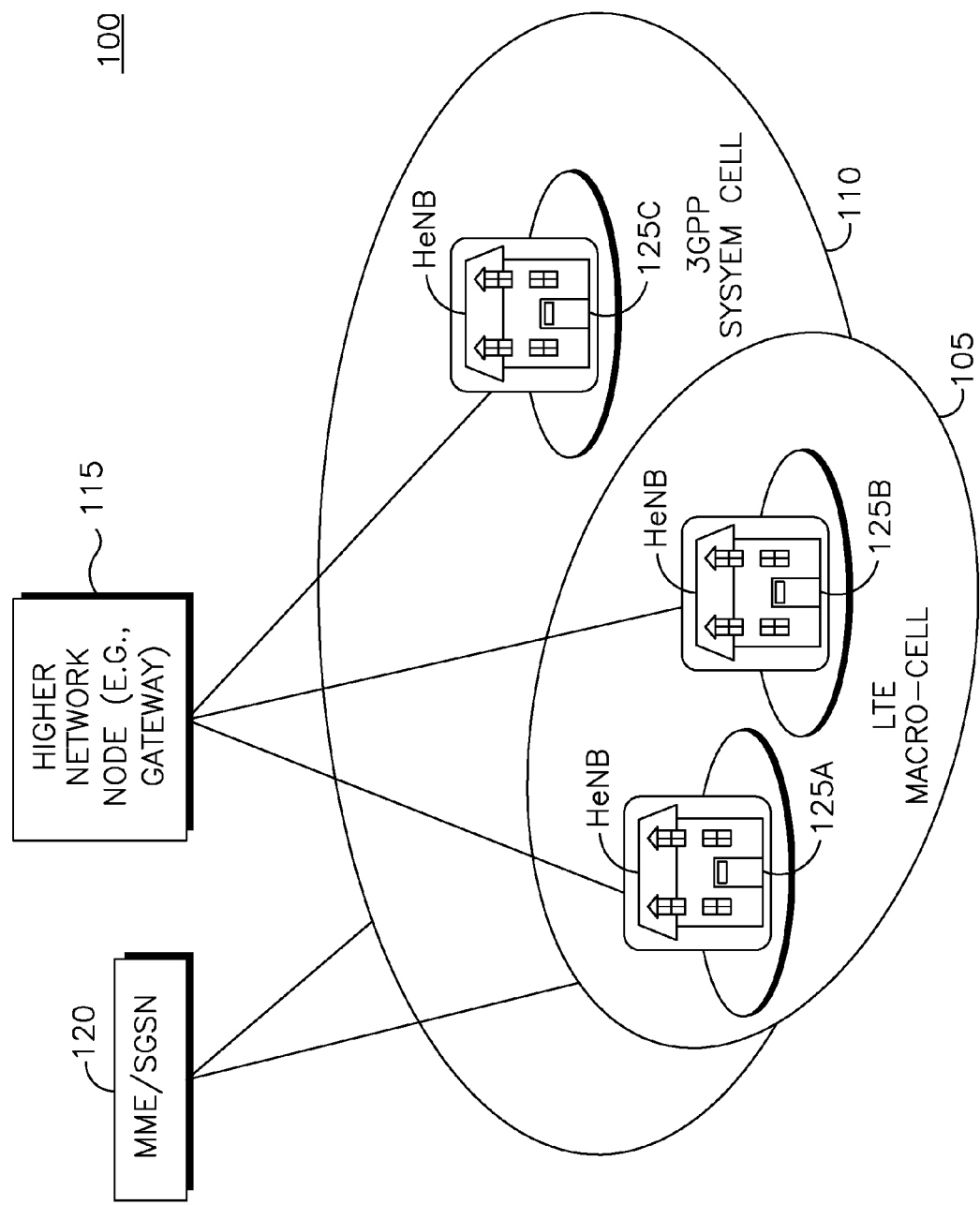
FIG. 1 shows an example of an HNB deployment in a wireless communication system.

FIG. 1 shows an example of a HNB deployment in a wireless communication system 100. The wireless communication system 100 includes an LTE open-cell 105, a 3GPP system cell 110, a higher network node (e.g., gateway) 115 and/or a mobility management entity (MME)/serving general packet radio service (GPRS) support node (SGSN) 120. The higher network node 115 is responsible for coordinating the operation of several HNBs 125A, 125B and 125C. Alternatively, the MME/SGSN 120 may be responsible for coordinating the operation of several HNBs 125A, 125B and 125C. The MME is the LTE equivalent of a 3G/2G SGSN. The relationship between the LTE open-cell 105 and the 3GPP system 110, (e.g., WCDMA/global system for mobile communications (GSM)), is that there may be areas where the coverage of these two technologies overlap. It is similar to simultaneous coverage of GSM and WCDMA technologies. The higher network node 115 may be a gateway function which interfaces with the MME/SGSN 120. As a gateway, the role of the higher network node 115 may be to act as a single open-cell towards the MME/SGSN 120 while supporting several small home cells or closed subscriber group (CSG) cells.

Figure 2:
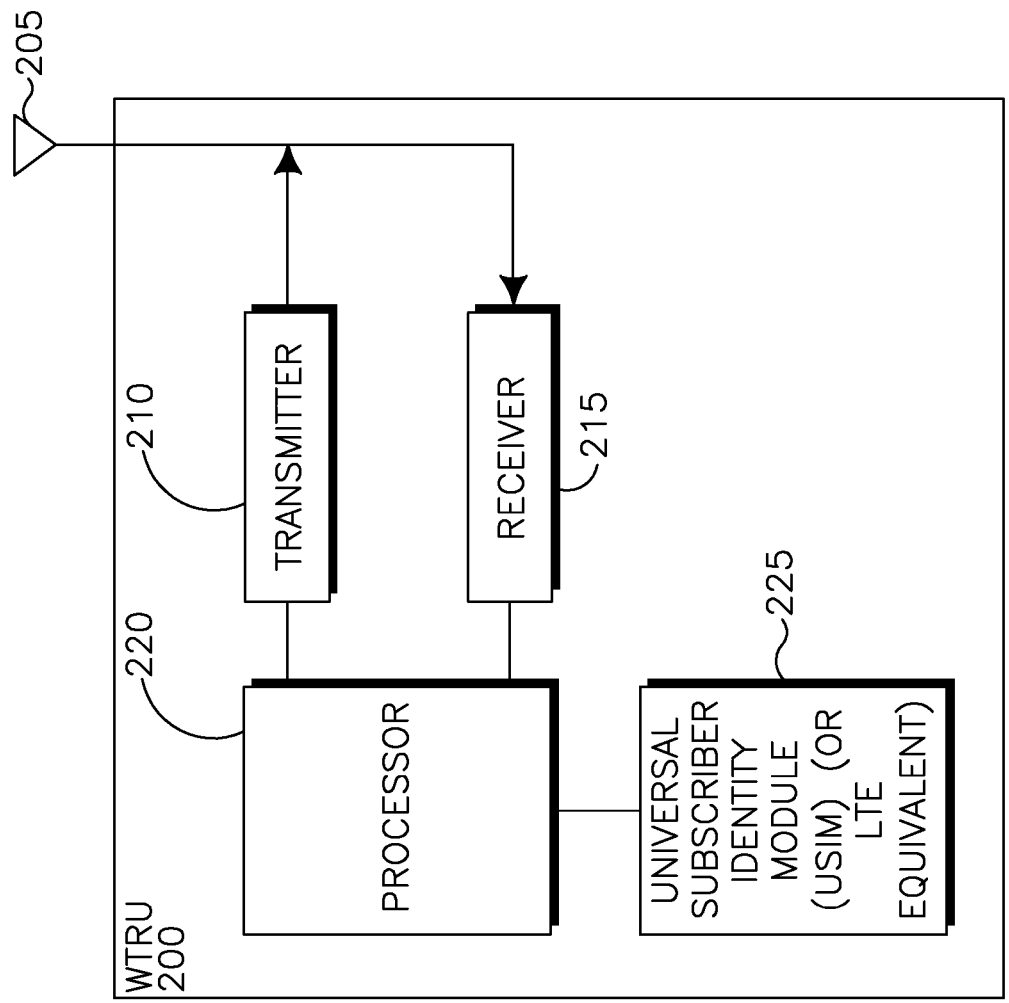
FIG. 2 shows an example of a block diagram of a WTRU that is configured to receive cell broadcasts and read information from closed subscriber group (CSG) cells.

The methods and procedures described herein may be practiced or and/or implemented or incorporated in a WTRU. FIG. 2 is an example block diagram of a WTRU 200 that is configured according to the embodiments disclosed herein. In addition to the components that may be found in a typical WTRU, the WTRU 200 includes an antenna 205, a transmitter 210, a receiver 215, a processor 220 and a universal subscriber identity module (USIM) (or LTE equivalent) 225. The receiver 215 is configured to receive a broadcast via the antenna 205 from a cell including a cell ID. The processor 220 is electrically coupled to the transmitter 210, the receiver 215 and the USIM (or LTE equivalent) 225. The processor 220 is configured to perform methods for avoiding interference from CSG cell when the WTRU is moving through a dense deployment of CSG cells.

Figure 3:
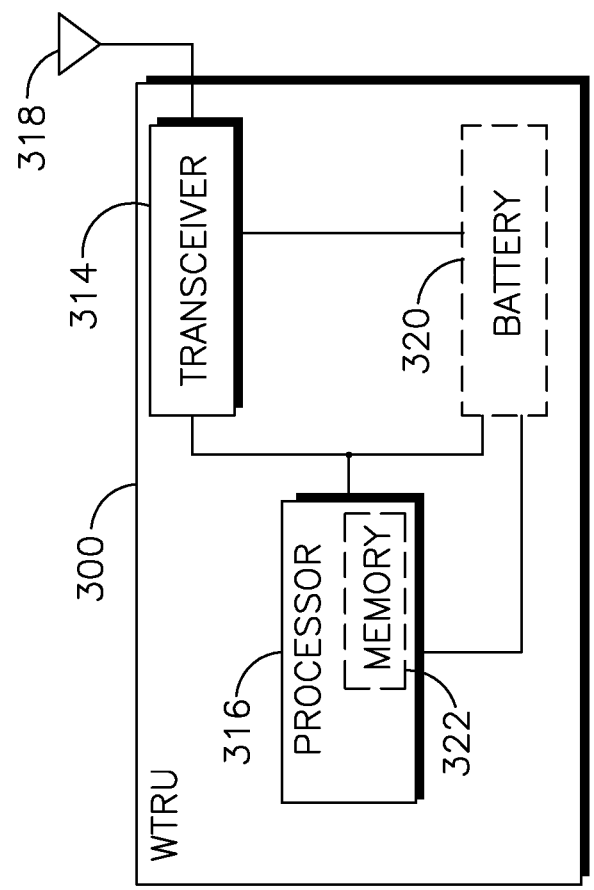
FIG. 3 shows another example of a block diagram of a WTRU that is configured to receive cell broadcasts and read information from CSG cells.

FIG. 3 is another example block diagram of WTRU 310 that is configured according to the embodiments disclosed herein. In addition to the components that may be found in a typical WTRU, the WTRU 310 includes a processor 316 with an optional linked memory 322, at least one transceiver 314, an optional battery 320, and an antenna 318. The processor 316 is configured to perform methods for avoiding interference from CSG cells when a WTRU is moving through a dense deployment of CSG cells. The transceiver 314 is in communication with the processor 316 and the antenna 318 to facilitate the transmission and reception of wireless communications. In case a battery 320 is used in the WTRU 310, it powers the transceiver 314 and the processor 316.

An HNB CSG cell is a defined area over which radio coverage provided by the HNB may only be accessed by a group of subscribers authorized to use the services of the cell. The CSG may be a family or anyone in the vicinity of a particular location, (e.g., anyone in a coffee shop), who attempts to access the HNB CSG cell. An HNB may typically be used to deploy one or more CSG cells over an area where service coverage may be desired. A CSG cell may be deployed by an HNB for network services, such as LTE, WCDMA or other legacy 3GPP RAT services. The subscriber, whether an individual or an organization, may deploy a CSG cell using an HNB over an area where such service is desired.

The embodiments disclosed herein relate to using a WTRU-implemented procedure for avoiding interference from closed subscriber group (CSG) cells. The embodiments may be employed during the WTRU detection of a best ranked cell that is a non-suitable CSG cell, or after a certain amount of time during which the best ranked cell was a non-suitable CSG cell. Accordingly, to prevent any excessive interference from CSG cells, a WTRU may perform one or a combination of the following actions.

In one example embodiment, the WTRU may consider overriding the priority of the frequency used by the best ranked CSG cell that is a non-suitable cell such that the WTRU considers this frequency now to be the lowest priority. In this embodiment, the frequency may be set to the lowest priority frequency among a list of possible configured priorities. Alternatively, the WTRU may consider the next lower priority frequency as a frequency higher than the current frequency of the non-suitable CSG cell. In this embodiment, the WTRU may also consider the priority of the frequency of the non-suitable CSG cell as the lowest possible frequency among all frequencies within the same radio access technology (RAT). Alternatively, the non-suitable cell frequency priority may be lowered to the priority of the next lower frequency priority within the same RAT. In this embodiment, the WTRU may also consider the current frequency of the non-suitable cell to be the lowest priority frequency (i.e., lower than the eight network configured values).

In another example embodiment, the WTRU may perform inter-frequency measurements on other frequencies to find a suitable cell. In the description herein, inter-frequency measurements may mean measurements on other frequencies for the same RAT on which the WTRU is currently camped on. Alternatively, inter-frequency measurements may mean measurements on other frequencies for any RAT including RATs different from the one the WTRU is currently camped.

In another example embodiment, the WTRU may modify (e.g., increase) the value of a threshold $Thres_{x,\,high}$ of the frequency used by the non-suitable CSG cell to decrease the possibility that the WTRU satisfies the criterion for staying on the non-suitable CSG cell.

In another example embodiment, the WTRU may modify (e.g., increase) the value of a threshold $Thres_{x,low}$ of the frequency used by the non-suitable CSG cell to increase the possibility that the WTRU reselects a cell of another frequency or RAT.

In another example embodiment, the WTRU may modify (e.g., decrease) the values of the thresholds $Thres_{x,\,high}$ and/or $Thres_{x,\,low}$ of other frequencies or RATs to increase the possibility that the WTRU performs a reselection towards a different frequency or RAT (e.g., the frequency or RAT corresponding to the modified threshold) in lieu of the frequency of the non-suitable CSG cell.

Figure 4:
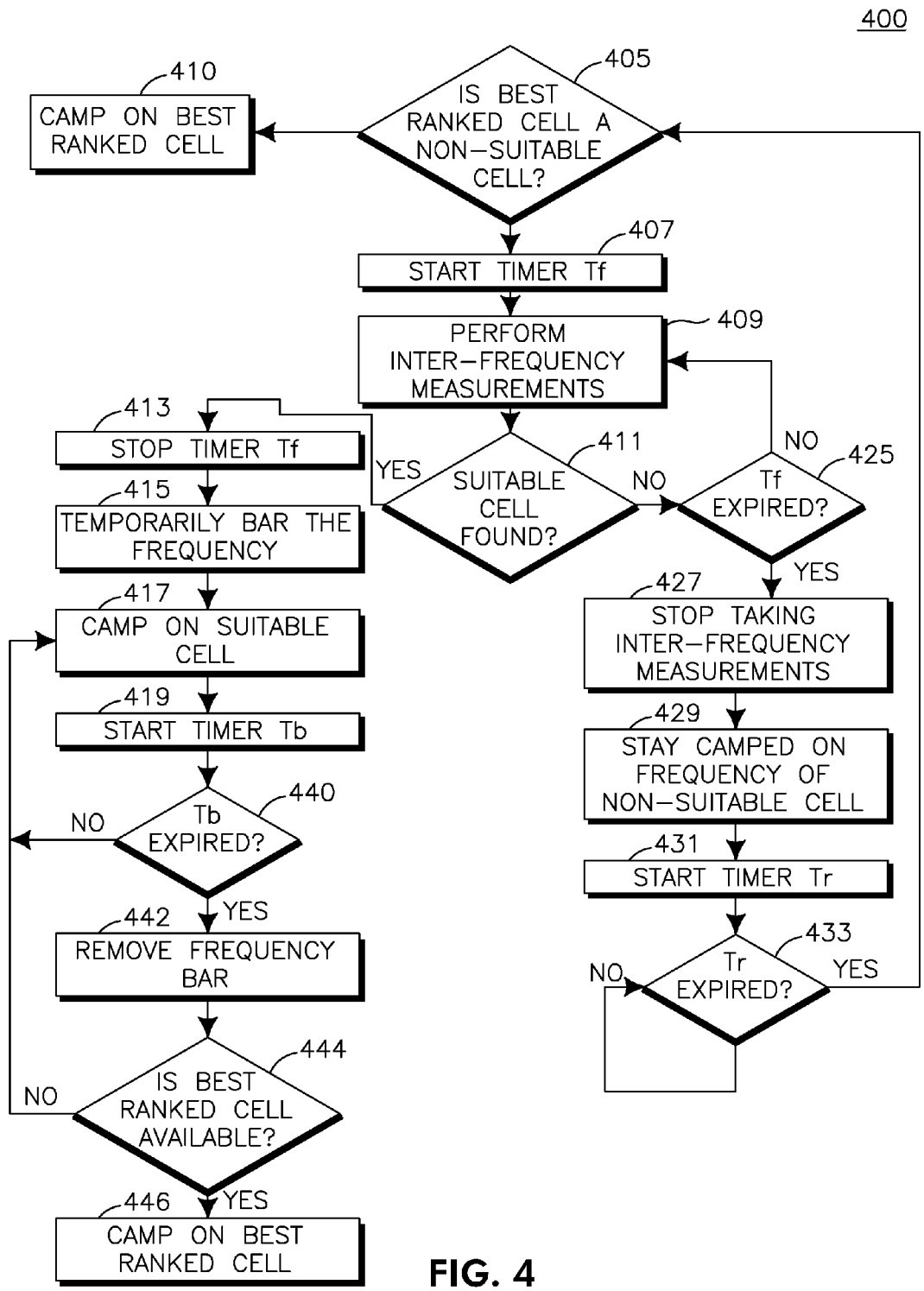
FIG. 4 shows an example flowchart of an inter-frequency measurement in accordance with one example method.

In another example embodiment, the WTRU may employ a method 400 shown in FIG. 4 for taking inter-frequency measurements to find a suitable cell on another frequency before temporarily barring the frequency where the non-suitable CSG cell is operating. The terminology "barring the frequency" refers to the situations where a WTRU is not allowed to camp on any cell of the barred frequency.

A WTRU initially determines whether a best ranked cell is a non-suitable cell (405). If the best ranked cell is a non-suitable cell, then the WTRU starts a timer Tf (407) and performs inter-frequency measurements on other frequencies to find a suitable cell (409). Otherwise, the WTRU camps on the best ranked cell (410).

If the WTRU finds a suitable cell on another frequency (411), the WTRU may stop timer Tf (413). The WTRU may also temporarily bar the frequency where the non-suitable CSG cell is operating (415), may camp on the found suitable cell (on the other frequency) (417) and may start a timer Tb (419). The WTRU may not perform inter-frequency measurements on a barred frequency while Tb is running.

If the WTRU fails to find a suitable cell (411) and the timer Tf expires (425), then the WTRU stops taking inter-frequency measurements (unless otherwise warranted per other conditions) (427). The WTRU may stay camped on the frequency of the non-suitable CSG cell (429), and may start a timer Tr (431). If the timer Tf has not expired (425), continue taking inter-frequency measurements (409). If the timer Tr has expired (435), then WTRU may re-start method 400.

If the timer Tb expires (440), the WTRU may remove the bar on the frequency where the non-suitable CSG cell is operating (442). The WTRU may then return to the frequency and determine if the CSG cell is now suitable (444). If the CSG cell is determined to be suitable, the WTRU may then camp on the best-ranked CSG cell (446). If the best ranked cell on the frequency is still a non-suitable CSG cell, the WTRU may stay camped on the suitable cell on the other frequency (417) and re-start timer Tb (419).

Figure 5:
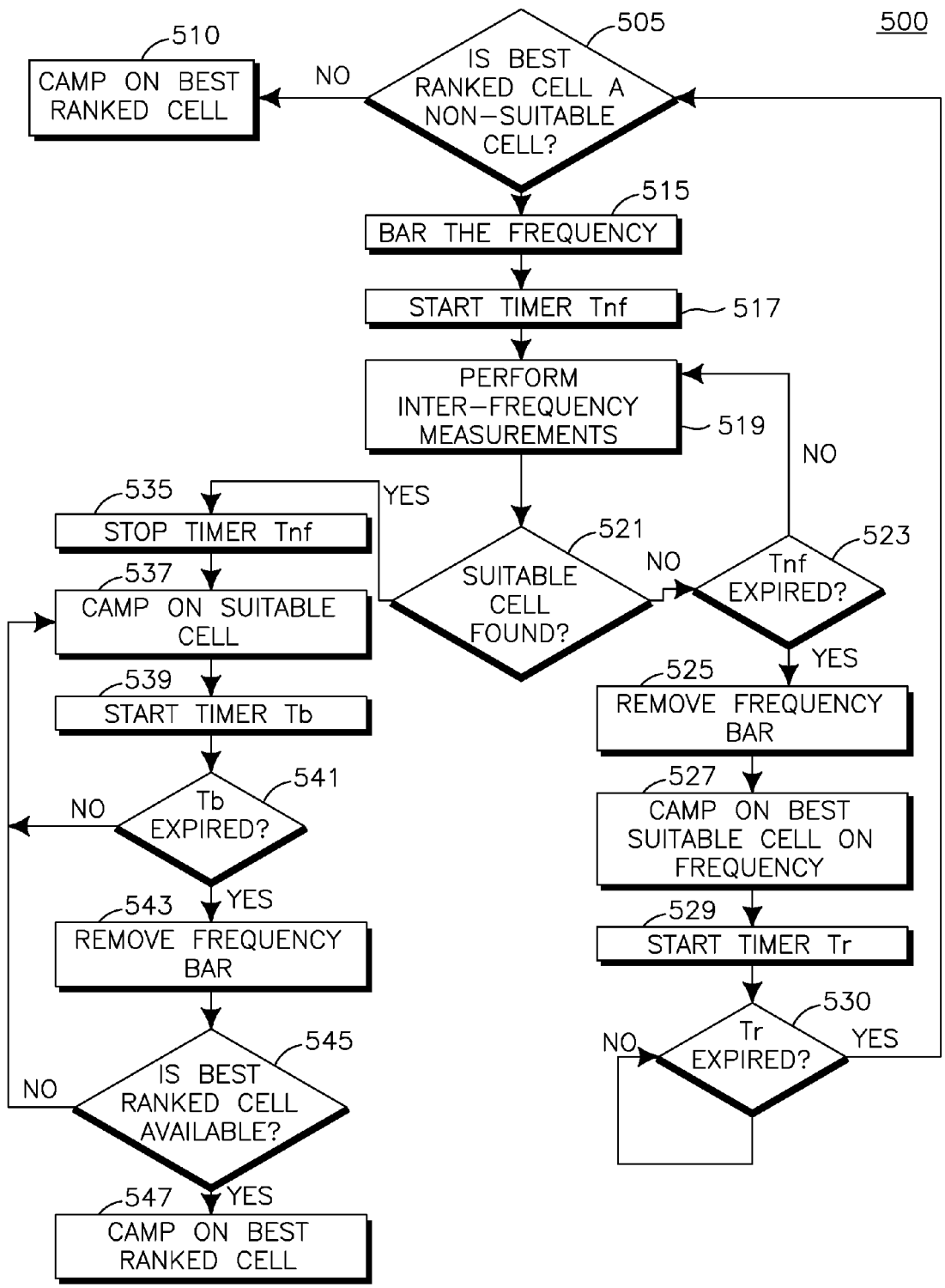
FIG. 5 shows an example flowchart of an inter-frequency measurement in accordance with another example method.

In another example embodiment, the WTRU may employ a method 500 shown in FIG. 5 for removing a bar (i.e., restriction) on a frequency where the non-suitable CSG cell is operating in case the WTRU fails to find a suitable cell or frequency within a certain amount of time. A WTRU initially determines whether a best ranked cell is a non-suitable cell (505). If the best ranked cell is a non-suitable cell, then the WTRU bars the frequency on which the non-suitable cell is operating (515) and starts a timer Tnf (517). Otherwise, the WTRU camps on the best ranked cell (510).

The WTRU performs inter-frequency measurements on other frequencies to find a suitable cell (519). If the WTRU fails to find a suitable cell on another frequency or RAT (521), the WTRU then determines if timer Tnf has expired (523). If timer Tnf has expired, the WTRU removes the bar on the frequency where the non-suitable CSG cell is operating (525) and camps on the best suitable cell on that frequency (527). The WTRU may also start a timer Tr (529). If the timer Tr has expired (530) then WTRU may re-start method 500.

If the WTRU finds a suitable cell on another frequency or RAT, then the WTRU stops timer Tnf (535), camps on the suitable cell (537) and starts timer Tb (539). When the timer Tb expires (541), the WTRU may remove the bar on the frequency where the non-suitable CSG cell is operating (543). The WTRU may then return to the frequency and determine if the CSG cell is now suitable (545). If the CSG cell is determined to be suitable, the WTRU may then camp on the best-ranked CSG cell (547). If the best ranked cell on the frequency is still a non-suitable CSG cell, the WTRU may stay on the suitable cell on the other frequency (537) and re-start timer Tb (539).

Figure 6:
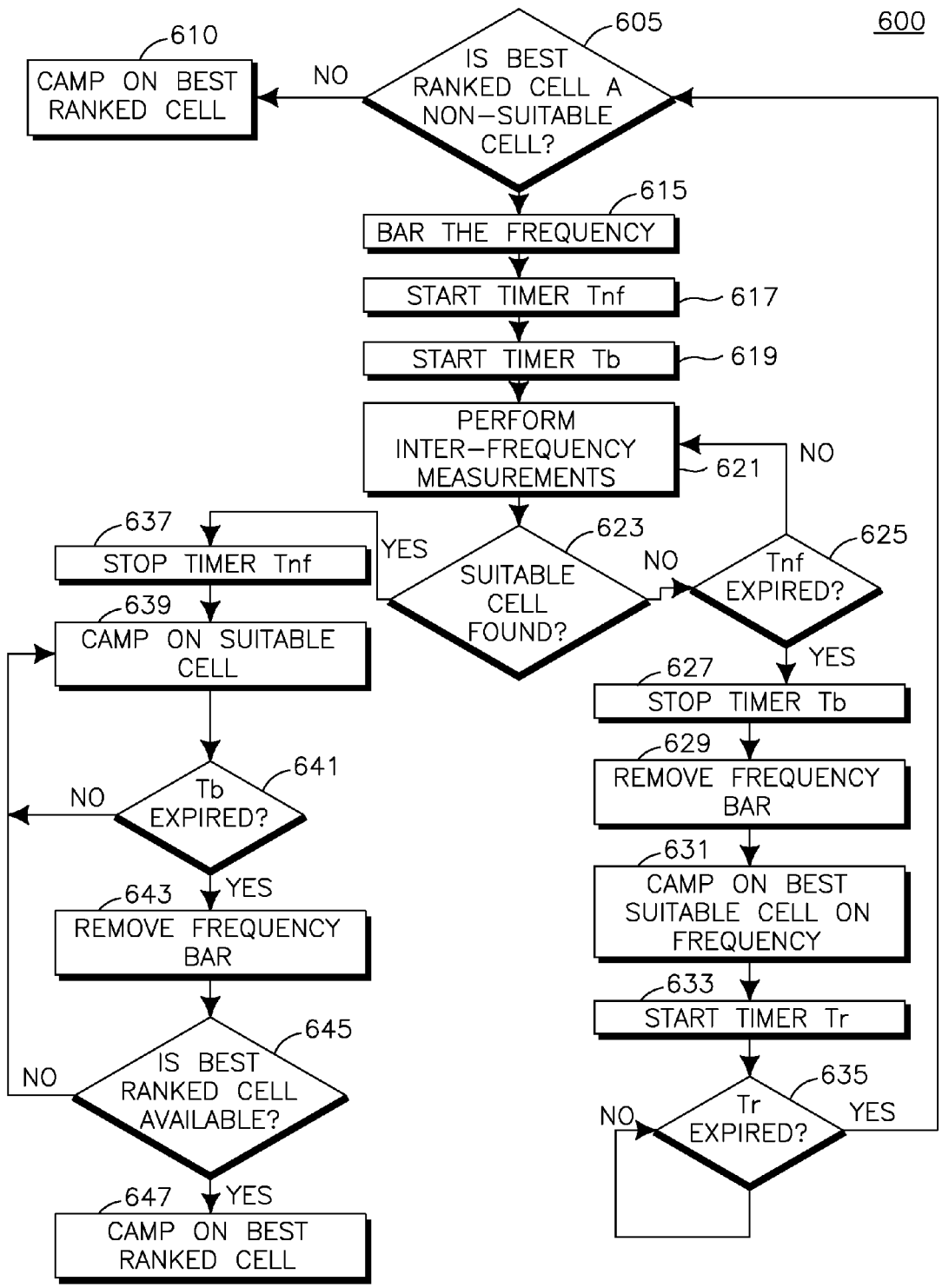
FIG. 6 shows an example flowchart of an inter-frequency measurement in accordance with still another example method.

In a further example action, the WTRU may employ a method 600 shown in FIG. 6 for removing a bar on a frequency where the non-suitable CSG cell is operating in case the WTRU fails to find a suitable cell or frequency within a certain amount of time. A WTRU initially determines whether a best ranked cell is a non-suitable cell (605). If the best ranked cell is a non-suitable cell, then the WTRU bars the frequency on which the non-suitable cell is operating (615), and starts timers Tnf (617) and Tb (619). Otherwise, the WTRU camps on the best ranked cell (610).

The WTRU performs inter-frequency measurements on other frequencies to find a suitable cell (621). If the WTRU fails to find a suitable cell on another frequency or RAT (623), the WTRU then determines if timer Tnf has expired (625). If timer Tnf has expired, the WTRU stops timer Tb (627), removes the bar on the frequency where the non-suitable CSG cell is operating (629) and camps on the best suitable cell on that frequency (631). The WTRU may also start a timer Tr (633). If the timer Tr has expired (635), then WTRU may re-start method 600. Otherwise it cycles until timer Tb expires.

If the WTRU finds a suitable cell on another frequency or RAT was found, then the WTRU stops timer Tnf (637), and camps on that cell (639). When timer Tb expires (641), the WTRU may remove the bar on the frequency where the non-suitable CSG cell is operating (643). The WTRU may then return to the frequency and determine if the CSG cell is now suitable (645). If the CSG cell is determined to be suitable, the WTRU may then camp on the best-ranked CSG cell (647). If the best ranked cell on the frequency is still a non-suitable CSG cell, the WTRU re-starts timer Tb (650) and may stay on the suitable cell on the other frequency (639).

The priority override described herein includes assigning an arbitrary priority number which is lower than all possible network configured values or N values lower than then a current priority number, where N is an integer number equal to or greater than 1. If multiple frequencies are affected by the priority override, the WTRU may assign different priority values to the different frequencies. The WTRU may assign priority values according to one or a combination of criteria. One example criteria may be the frequency for which the signal strength from the non-suitable CSG cell is the strongest gets the lowest priority. Another example criteria may be the frequency for which the signal strength from the best suitable cell is the strongest, gets the highest priority. Yet another example criteria may be the frequency for which the signal strength difference between the non-suitable cell and the best suitable cell is the highest gets the lowest priority. Still another example criteria may be a frequency for which the non-suitable CSG cell has set the intra-frequency reselection indicator (IFRI) to "not-allowed" has a lower priority than a frequency for which the non-suitable CSG cell has the IFRI set to "allowed". A further example criteria may be that the WTRU swaps priorities with the first next lower priority number after the current one.

Absolute priority-based cell reselection procedures for Release 8 only consider cells on frequencies for which a priority is assigned. When the best ranked cell is a non-suitable CSG cell, this condition may be lifted to allow the WTRU to select the other frequency, even if this frequency has not been assigned a priority. The WTRU may assign an implicit priority to these frequencies based on one or a combination of rules. In one example rule, the WTRU may assign as a priority, one level above the priority assigned to the frequency used by the CSG cell. In another example rule, if only one other frequency exists, the WTRU may assign the highest priority to this frequency. In yet another example rule, if more than one other frequency exists, and some of these already have an assigned priority, the WTRU may assign a priority equal to the lowest of these frequencies.

The change of absolute priorities or implicit priorities may allow the WTRU to take measurements on other frequencies or RATs even if it is connected to the highest priority frequency and RAT and even if the quality of the cells in the current frequency are above the threshold that trigger the WTRU to start taking measurements. If according to the inter-frequency measurements on all the frequencies and RATs with a priority lower than the current one, the WTRU does not find a suitable frequency or any cells with acceptable channel conditions, the WTRU may stay connected to the current frequency and cell.

The actions described herein may be triggered by one or a combination of additional conditions. One example condition may be that the received signal strength and/or quality from the best suitable cell in the current frequency is below a threshold, or has been below a threshold for a certain amount of time. Another example condition may be that the measured path loss from the best suitable cell is above a threshold, or has been above a threshold for a certain amount of time. Still another example condition may be that the received signal strength and/or quality from the non-suitable CSG cell is above a threshold, or has been above a threshold for a certain amount of time. Yet another example condition may be that the measured path loss from non-suitable CSG cell is below a threshold, or has been below a threshold for a certain amount of time. A further example condition may be that the difference between the received signal strength of the non-suitable CSG cell and the best suitable cell is above or below a threshold, or has been above or below a threshold for certain amount of time. Yet another example condition may be that the WTRU decoded that the non-suitable CSG cell has set the IFRI to "not-allowed". Still another example condition may be that the dedicated priorities have not been assigned to the WTRU.

The majority of the above conditions may trigger a search for an inter-frequency cell from the WTRU perspective (e.g., when the downlink (DL) interference measured at the WTRU is high or when the quality of the received signal from the suitable cell is low). In some cases, the conditions at the WTRU may be acceptable, but its uplink (UL) transmissions may cause interference to the non-suitable CSG cell. In such a case, the CSG cell may benefit from a mechanism to notify the WTRU to begin an intra-frequency search. The CSG cell may begin increasing the transmit power, thereby increasing the interference to the WTRU. The increased interference may trigger the WTRU to perform an intra-frequency search. The amount of increase may be linked to the perceived interference at the HNB. This transmit power increase may persist for a configurable amount of time. Optionally, the HNB may continue increasing this power (up to some maximum) until the WTRU changes frequency. Alternatively, the CSG cell may monitor the uplink quality, and when it sees high uplink interference, it may set the IFRI bit to "not-allowed". As the WTRU may continue to perform autonomous cell search, in a subsequent cell reselection attempt to the CSG cell, it may determine that it needs to change frequency.

The priority override or the implicit priority and measurements may stay in effect until one or a combination of events occur. One example event may be a timer started at the time the priority override took effect expires. The timer may be pre-defined, or signaled by higher layers. It may be an existing timer value such as a T320 in long term LTE or T322 in UMTS. Another example event may be that the non-suitable CSG cell is no longer the best ranked, or a timer started at the time the non-suitable CSG cell is no longer the best ranked expires. Still another example event may be a suitable cell (CSG or open) that becomes the best ranked, or a timer started at the time the suitable cell became the best ranked expires. Another example event may be an additional condition becomes false, or a timer started when the condition became false expires. Yet another example event may be that the WTRU enters the RRC_CONNECTED state. Still a further example event may be that the public land mobile network (PLMN) selection is performed on request by non-access stratum (NAS). A further example event may be that a manual CSG selection is performed on request by NAS. Yet another example event may be that a concerned CSG cell becomes suitable, for example, following a manual CSG selection. A further example event may be that a timer started at the time the WTRU re-selected to a suitable cell on another frequency expired. Still a further example event may be that a new set of dedicated priorities is received by the network. A further example event may be that the dedicated priority timers, such as the T320 or T322 expire.

The above overriding of a frequency priority may supersede any overriding of a frequency priority due to circuit switched/packet switched (CS/PS) mode of operation of the WTRU. Once the above mentioned conditions become true, the WTRU may revert back to the prior priorities. Alternatively, the WTRU may clear the priorities and reacquire them. Alternatively, the WTRU behaves as if the T322 timer has expired and takes the current actions associated with the expiry of the T322 timer.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU) to avoid interference caused by a closed subscriber group cell (CSG), the method comprising:
    detecting that a best ranked cell is a non-suitable CSG cell;
    baring a frequency used by the best ranked non-suitable CSG cell by resetting the non-suitable CSG cell frequency priority to a lower frequency priority to enable another cell to become the best ranked cell; and
    allowing the WTRU to select another cell on at least one of another frequency or radio access technology (RAT).

2. The method as in claim 1, wherein baring further includes setting the non-suitable CSG cell frequency priority to a lowest frequency priority among a list of possible configured priorities.

3. The method as in claim 1, wherein baring includes setting the non-suitable CSG cell frequency priority to a lowest frequency priority among all frequencies within the same radio access technologies (RATs).

4. The method as in claim 1, wherein allowing further includes performing inter-frequency measurements on one of another frequency or RAT to find a suitable cell.

5. The method as in claim 1, wherein the baring includes modifying a value of a threshold of the frequency used by the non-suitable CSG cell to prevent the WTRU from selecting the non-suitable CSG cell frequency.

6. The method as in claim 1, wherein the baring includes modifying a value of a threshold of the frequency used by the non-suitable CSG cell to prompt the WTRU to reselect a cell of another frequency.

7. The method as in claim 1, wherein the baring includes assigning a priority number N values lower than the priority number of the non-suitable CSG cell, wherein N is an integer number equal to or greater than 1.

8. The method as in claim 7, further comprising assigning the lowest priority number to the non-suitable CSG cell with the strongest signal strength.

9. The method as in claim 1, wherein the baring includes assigning an implicit priority on a condition that a priority frequency has not been assigned by the network.

10. The method as in claim 9, wherein the implicit priority assignment is configured to be one level above the priority assigned to the frequency used by the non-suitable CSG cell.

11. The method as in claim 9, wherein the WTRU takes measurements on other frequencies on a condition that the frequency of the non-suitable CSG cell is above a threshold.

12. The method as in claim 1, wherein the WTRU is notified by the non-suitable CSG cell to begin an inter-frequency search.

13. The method as in claim 12, wherein the CSG cell notifies the WTRU to begin an inter-frequency search by increasing transmission power until the WTRU changes frequency.

14. The method as in claim 1, wherein the non-suitable CSG cell sets an inter frequency reselection indicator (IFRI) bit to "not allowed" to signal to the WTRU to change frequency.

15. A method for use in a wireless transmit/receive unit (WTRU) for avoiding interference caused by a closed subscriber group cell (CSG) the method comprising:
   detecting that a best ranked cell is a non-suitable CSG cell;
   initiating inter-frequency measurements to find a suitable cell on another frequency or radio access technology (RAT) for a first predetermined time;
   temporarily barring a frequency of the non-suitable CSG cell on a condition that a suitable cell is found on another frequency;
   camping on the suitable cell for a second predetermined time on a condition that a suitable cell is found; and
   removing a bar on the frequency of the non-suitable CSG cell upon expiration of the second predetermined time to determine availability of the best ranked cell.

16. A method for use in a wireless transmit/receive unit (WTRU) for avoiding interference caused by a closed subscriber group cell (CSG) the method comprising:
   detecting that a best ranked cell is a non-suitable CSG cell;
   initiating inter-frequency measurements to find a suitable cell on another frequency or radio access technology (RAT) for a first predetermined time;
   temporarily barring a frequency of the non-suitable CSG cell on a condition that a suitable cell is found on another frequency;
   camping on the suitable cell for a second predetermined time on a condition that a suitable cell is found;
   camping on a frequency of the non-suitable CSG cell upon expiration of the first predetermined time; and
   detecting availability of the best ranked cell after expiration of a third predetermined time.

17. A method for use in a wireless transmit/receive unit (WTRU) for avoiding interference caused by a closed subscriber group cell (CSG) the method comprising:
   detecting that a bested rank cell is a non-suitable CSG cell;
   barring a frequency of the non-suitable CSG cell;
   initiating inter-frequency measurements to find a suitable cell on another frequency or radio access technology (RAT) for a first predetermined time; and
   removing a bar on the frequency of the non-suitable CSG cell upon expiration of the first predetermined time and failure to find a suitable cell on another frequency.

18. A wireless transmit/receive unit (WTRU) for avoiding interference caused by a closed subscriber group cell (CSG), comprising:
   a processor configured to detect that a best ranked cell is a non-suitable CSG cell;
   the processor configured to bar a frequency used by the best ranked non-suitable CSG cell by resetting the non-suitable CSG cell frequency priority to a lower frequency priority to enable another cell to become the best ranked cell; and
   the processor configured to allow the WTRU to select another cell on at least one of another frequency or radio access technology (RAT).

19. The WTRU as in claim 18, wherein the processor is further configured to bar the frequency by setting the non-suitable CSG cell frequency priority to a lowest frequency priority among a list of possible configured priorities or set a non-suitable CSG cell frequency priority to a lowest frequency priority among all frequencies within the same radio access technologies (RATs).

20. The WTRU as in claim 18, wherein the WTRU is configured to perform inter-frequency measurements on one of another frequency or RAT to find a suitable cell.

21. The WTRU as in claim 18, the processor configured to modify one of: a value of a threshold of the frequency used by the non-suitable CSG cell to prevent the WTRU from selecting the non-suitable CSG cell frequency or a value of a threshold of the frequency used by the non-suitable CSG cell to prompt the WTRU to reselect a cell of another frequency.

22. A wireless transmit/receive unit (WTRU) for avoiding interference caused by a closed subscriber group cell (CSG), comprising:
   a processor configured to detect that a best ranked cell is a non-suitable CSG cell;
   the processor configured to initiate inter-frequency measurements to find a suitable cell on another frequency or radio access technology (RAT) for a first predetermined time;
   the processor configured to temporarily bar a frequency of the non-suitable CSG cell on a condition that a suitable cell is found on another frequency;
   the WTRU configured to camp on the suitable cell for a second predetermined time on a condition that a suitable cell is found; and
   the processor configured to remove a bar on the frequency of the non-suitable CSG cell upon expiration of the second predetermined time to determine availability of the best ranked cell.

23. The WTRU as in claim 22, further comprising:
the WTRU configured to camp on a frequency of the non-suitable CSG cell upon expiration of the first predetermined time; and
the processor configured to detect availability of the best ranked cell after expiration of a third predetermined time.

24. A wireless transmit/receive unit (WTRU) for avoiding interference caused by a closed subscriber group cell (CSG), comprising:
a processor configured to detect that a best ranked cell is a non-suitable CSG cell;
the processor configured to initiate inter-frequency measurements to find a suitable cell on another frequency or radio access technology (RAT) for a first predetermined time;
the processor configured to temporarily bar a frequency of the non-suitable CSG cell on a condition that a suitable cell is found on another frequency;
the WTRU configured to camp on the suitable cell for a second predetermined time on a condition that a suitable cell is found; and
the processor configured to remove a bar on the frequency of the non-suitable CSG cell upon expiration of the second predetermined time to determine availability of the best ranked cell.

25. A wireless transmit/receive unit (WTRU) for avoiding interference caused by a closed subscriber group cell (CSG), comprising:
a processor configured to detect that a best ranked cell is a non-suitable CSG cell;
the processor configured to bar a frequency of the non-suitable CSG cell;
the processor configured to initiate inter-frequency measurements to find a suitable cell on another frequency or radio access technology (RAT) for a first predetermined time; and
the processor configured to remove a bar on the frequency of the non-suitable CSG cell upon expiration of the first predetermined time and failure to find a suitable cell on another frequency.

* * * * *